Dec. 14, 1965  T. C. ZINNIGER  3,222,779
STITCHING APPARATUS
Original Filed Feb. 28, 1963  4 Sheets-Sheet 1
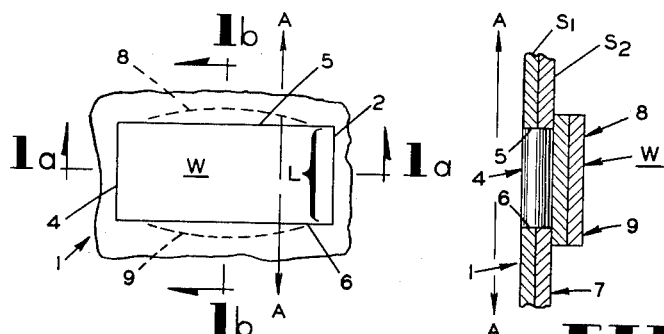
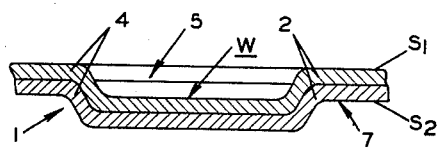
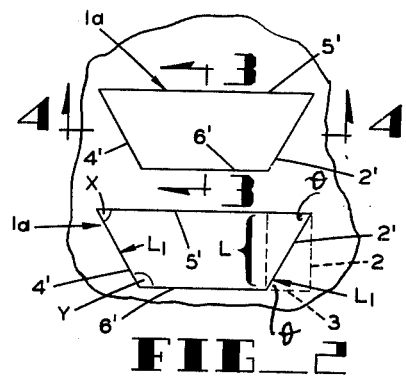
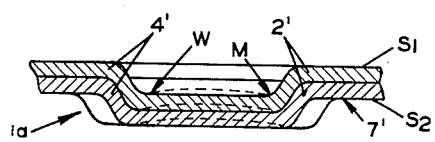
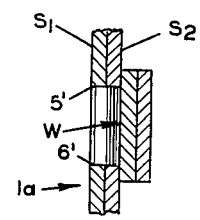
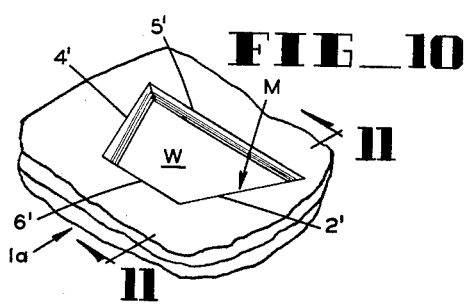
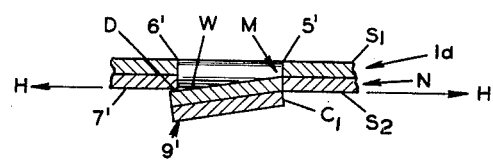
INVENTOR.
THEODORE C ZINNIGER
BY Dec. 14, 1965     T. C. ZINNIGER     3,222,779
STITCHING APPARATUS
Original Filed Feb. 28, 1963     4 Sheets-Sheet 2
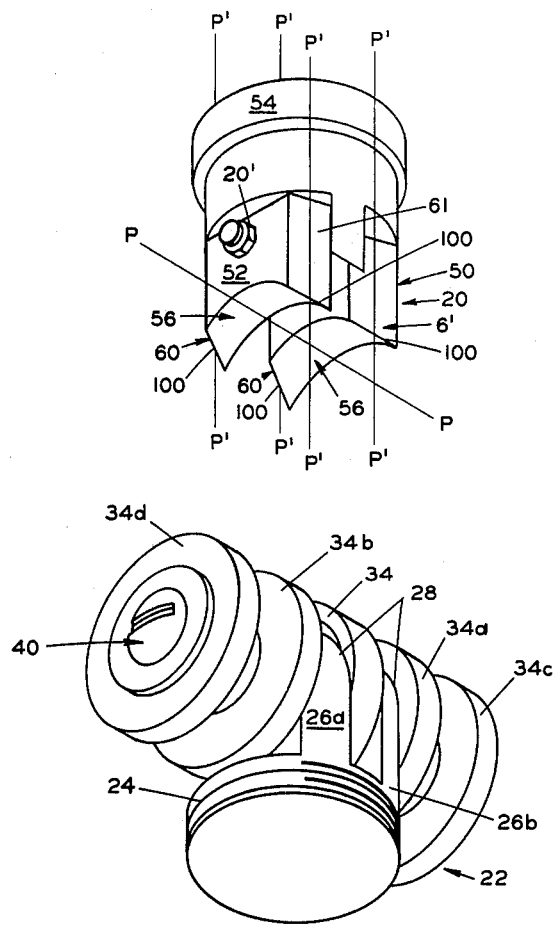
FIG_5
INVENTOR.
THEODORE C ZINNIGER

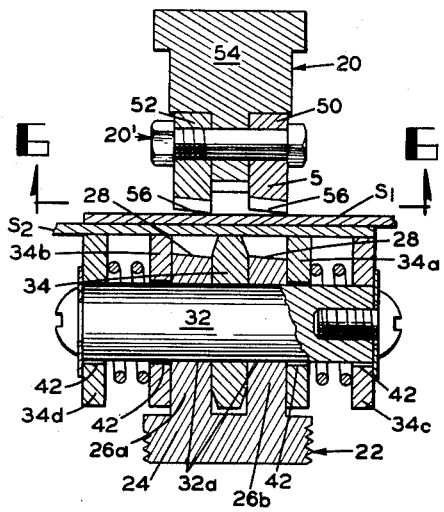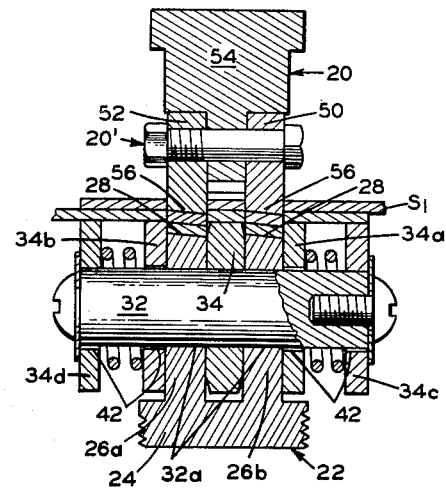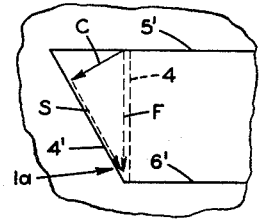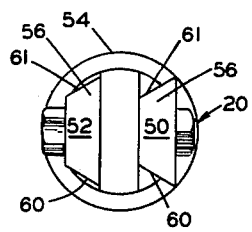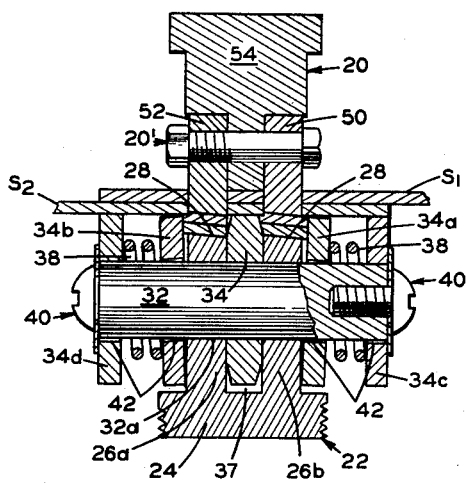

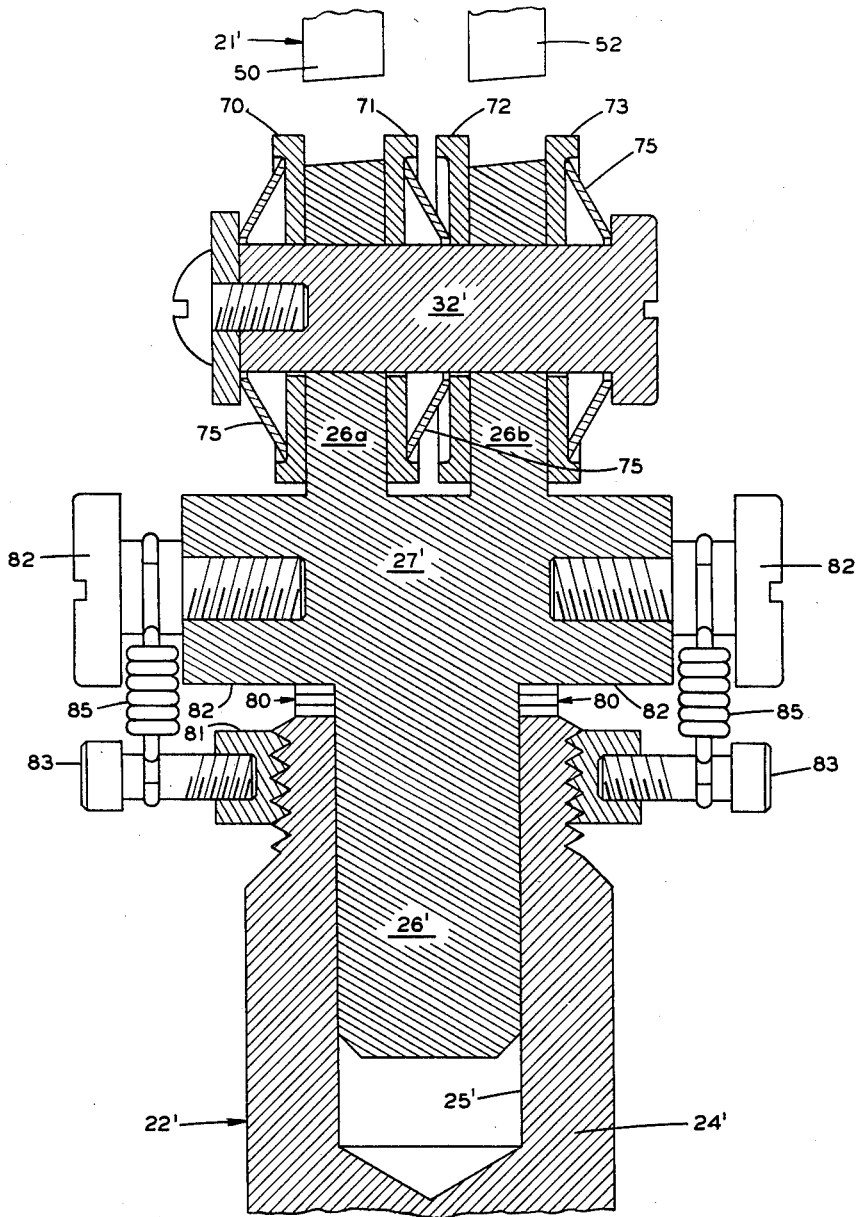
FIG_12

United States Patent Office 3,222,779
Patented Dec. 14, 1965

3,222,779
STITCHING APPARATUS
Theodore C. Zinniger, Hayward, Calif., assignor to Kaiser Aluminum & Chemical Corporation, Oakland, Calif., a corporation of Delaware
Original application Feb. 28, 1963, Ser. No. 261,648. Divided and this application Feb. 5, 1965, Ser. No. 435,777
10 Claims. (Cl. 29—566)

This application also constitutes a division of my prior application Serial No. 261,648, filed February 28, 1963.

This invention relates to an apparatus for joining together overlapped pieces of material by means of fastener elements formed integrally with the respective pieces of material, as well as the fastener elements formed thereby.

Accordingly, it is a primary purpose of this invention to provide a novel apparatus for fastening together a plurality of sheets of material, such as metal sheets, without the use of additional or external fastening elements, as well as a novel fastening element formed as an integral part of the pieces of material being fastened together.

Other purposes and advantages of the instant invention will become more apparent by reference to the following detailed description when taken in conjunction with the appended drawings, wherein FIG. 1 is a broken plan view of a fastener made in accordance with prior art practices;

FIG. 1a is a cross-sectional view of the fastener shown in FIG. 1 when taken generally along the line 1a—1a thereof;

FIG. 1b is a cross-sectional view of the fastener shown in FIG. 1 when taken generally along the line 1b—1b thereof;

FIG. 2 is a broken plan view of the novel fastener of the instant invention and indicates how a plurality of such fasteners may be employed in the form of a pattern to join pieces of material together; this figure also discloses in phantom certain trigonometrical calculations or concepts used in arriving at the preferred configuration for the fastener of the instant invention;

FIG. 3 is a cross-sectional view of a fastener shown in FIG. 2 when taken generally along the line 3—3 thereof;

FIG. 4 is a cross-sectional view of a fastener shown in FIG. 2 when taken generally along the line 4—4 thereof;

FIG. 5 is an exploded perspective view of a suitable punch and die apparatus for use in practicing the instant invention;

FIG. 6 is a plan view of the punch portion of the apparatus shown in FIG. 5 when taken generally along the line 6—6 of FIG. 7;

FIGS. 7, 8 and 9 are partial sectional views of the punch and die apparatus of FIG. 5 used to practice the instant invention and discloses certain of the steps that can be employed in producing a fastener element of the instant invention;

FIG. 10 is a perspective view of a modified form of fastener of the instant invention;

FIG. 11 is a sectional view generally taken along the line 11—11 of FIG. 10;

FIG. 12 is a sectional view with parts broken away of a modified punch and die apparatus that can be advantageously used to practice the instant invention; and FIG. 13 is a fragmentary view of a fastener of the instant invention and discloses schematically how a shear load applied thereto is broken down into various components.

With further reference to the drawings, and in particular FIGS. 1 through 4, 10 and 11, the improved novel fastener of the instant invention is intended to overcome certain of the deficiencies which existed in prior art fasteners of the type shown in FIGS. 1 through 1b, such as the fasteners disclosed in U.S. Patents 2,254,558 and 2,924,312 issued September 2, 1941, and February 9, 1960, respectively, to I. A. Williams.

In the case of a prior art fastener of the type shown in FIGS. 1 through 1b, the spaced and parallel fold areas 2 and 4 at the side edges of the fastener constituted the weakest areas of the fastener. These fold lines 2 and 4 were located parallel to each other and at substantially right angles to the main parallel incisions or cuts 5 and 6 in the pieces of sheet material, such as metal sheets $S_1$ and $S_2$ from which the fastener was made. In general, the prior art fasteners contemplated that the composite metal web W of the fastener located between the folds 2 and 4 and incisions 5 and 6 and made up of integral parts of sheets $S_1$ and $S_2$ would be displaced out of the normal planes of the sheets $S_1$ and $S_2$ to a plane below the bottom surface 7 of the lowermost sheet of material $S_2$. After being displaced to a point below bottom surface 7, composite web W was then spread laterally outward adjacent the incisions 5 and 6, such as in the areas 8 and 9, below the bottom surface 7 of the lowermost sheet $S_2$ and into engagement with surface 7 so as to prevent disengagement of the members $S_1$ and $S_2$ from each other. Fold lines 2 and 4 are formed in the fastener 1 as the web W is displaced. These fold lines 2 and 4, however, represented the weakest parts of such a fastener in that they did not satisfactorily withstand severe shearing action applied to the joined pieces of material. By shearing action is meant the sliding action of the sheets $S_1$ and $S_2$ and folds 2 and 4 in the fastener 1 of the sheets $S_1$ and $S_2$ with respect to one another in the direction of either of the arrows A—A when opposing portions of the sheets $S_1$ and $S_2$ were subjected to a tensile pull in a direction normal to the incisions 5 and 6 and parallel to fold lines 2 and 4. When this tensile pull is exerted in the direction of either of the arrows A—A of FIG. 1, the fastener would tend to come apart as the material at the fold lines 2 and 4 of the pieces $S_1$ and $S_2$ of material fractured under the loads imposed thereon.

It has been found, however, that this weakness problem in such fasteners can be solved if the fasteners of FIGS. 1–1b are given a unique configuration. This unique configuration is preferably a trapeziform configuration.

Thus, the unique fastener element 1a of the instant invention is so made whereby it generally comprises integral portions of overlapping pieces of material which are displaced out of the respective normal planes of the said pieces of material. As indicated in FIG. 2, each of the pieces of displaced material is generally defined by a pair of laterally spaced-apart incisions 5' and 6' in the pieces, said incisions being preferably arranged parallel to each other, and a pair of preferably spaced-apart folds 2' and 4' in the pieces, said folds being arranged in angularly disposed converging relationship to each other. Each of the folds 2' and 4' also fully intersects with each of the laterally spaced-apart incisions 5' and 6' in the pieces such that one of the interior angles X of intersection is less than 90°, while the other interior angle Y of intersection is greater than 90°. Portions of each displaced piece of material adjacent at least one of the incisions is displaced completely below and underlies the bottom surface of the lowermost piece of material. In an advantageous embodiment of the invention the portion of the fastener adjacent the other incision can be comprised of portions of each piece of material which are displaced only below the bottom surface of an upper piece of material being joined by the fastener.

In the case of the fastener 1 shown in FIGS. 1–1b, this fastener is capable of transmitting its maximum load when it is designed to fail in shear along the fold lines 2 and 4 or when shear loads are applied in the direction of the arrows A—A. When, however, these fold lines are arranged or oriented in converging fashion or on diagonals in the manner shown in FIG. 2, the overall shear area of the new folds 2' and 4' of fastener 1a is substantially increased. This can be graphically illustrated in the following manner, reference being made to FIGS. 1 and 2. In the case of the fastener of FIGS. 1–1b, the distance L for each of the fold lines 2 and 4, each fold line also being at a right angle to the incision lines 5 and 6, is the same. For the configuration of the fastener 1 as shown in FIG. 1, the shear area for either of the folds 2 and 4 is readily calculated at $Lt$, $t$ being the combined thicknesses of the individual pieces of material in each fold line 2 or 4, and $L$, of course, being the length of the same.

Sloping each of the fold lines 2' and 4' in the manner indicated in FIG. 2 for new fastener 1a automatically increases the shear area of each of the new fold lines 2' and 4' of fastener 1a, as compared to fold lines 2 and 4 of fastener 1. The reason for this is illustrated by the theoretical right triangle shown schmatically and superimposed partially on the fastener 1a in FIG. 2. This triangle is formed by old fold line 2 of fastener 1, the new fold line 2' of fastener 1a and the base line represented by the reference numeral 3 as an extension of incision 6'. In forming such a triangle, it is assumed that incisions 5' and 6' of fastener 1a in FIG. 2 are located the same distance apart as incision lines 5 and 6 of fastener 1. In the aforesaid triangle, new fold line 2' thus becomes the hypotenuse of the triangle and, consequently, is longer than old fold line 2. Trigonometrically, therefore, the shear area of a new fold line 2' or 4' increases by the reciprocal of the sine of the angle $\vartheta$ of the above right triangle. Thus, whereas the shear area for either fold line 2 or 4 in the case of the fastener 1 of FIG. 1 is simply $Lt$, the shear area of either of the fold lines 2' or 4' in the fastener 1a of FIG. 2 is $L_2t_2$, $L_2$ being fastener 1a of FIG. 2 is $L_1t_1$, $L_1$ being the length of either of the fold lines 2' or 4' and $t_1$ being the combined thickness of the individual pieces of material in each of the new fold lines 2' and 4'. Since $L_1$ equals $$\frac{L}{\text{sine } \vartheta}$$

the new shear area of fold line 2' or 4' for fastener 1a can be written as $$\frac{Lt_1}{\text{sine } \vartheta}$$

In addition to increasing the shear area, sloping of the sides or folds 2' and 4' of the fastener 1a decreases the shear loads on each of the folds. This is illustrated graphically in the triangulation or diagram of forces superimposed upon the fastener element 1a shown in FIG. 13. FIG. 13 indicates that the applied load F which is applied in a direction parallel to that of a fold line 4 of a fastener 1 and normal to the incisions 5' and 6' automatically breaks down in the case of fastener 1a into components parallel and normal to diagonally disposed fold line 4' of fastener 1a, such as components C and S. Component C represents the portion of the load F which is applied in the form of a compressive load on the new fold line 4' of fastener 1a, while the component S which parallels new fold 4' of fastener 1a represents the portion of the load F which is applied in the form of a shear load.

In the case of fastener 1a, therefore, the shear load S is always less than the applied load F because in the right triangle of forces formed by C, S and F, F becomes the hypotenuse of the triangle; and S being one of the sides of the triangle, it must always be less than F. From the above, it follows that the shear load S per unit area of a diagonally disposed fold line 4' of fastener 1a in the above example will necessarily be less than in the case of where the applied load F is not broken down into separate shear and compressive components but remains as a single load applied along the length of and parallel to a fold line, such as fold line 4 of a prior art fastener 1. In the above example, it is also assumed that incision lines 5' and 6' of fastener 1a are located the same distance apart as incision lines 5 and 6 of a prior art fastener 1.

In a further advantageous embodiment, and as indicated in FIGS. 10 and 11, the fastener 1a of the instant invention can be made in such a way that the integral portions of the pieces of material $S_1$ and $S_2$ that are displaced out of the normal planes of the respective pieces of material in the form of the composite web W would be so displaced that the fastener would have a tapered configuration in a plane normal to the incisions 5' and 6', such as in the plane H of FIG. 11, and only a portion 9' of the fastener 1a adjacent one of the incision lines would be located completely below the bottom surface 7' of the lowermost sheet $S_2$ and thereafter spread underneath this bottom surface in the area D with the portion of the fastener displaced along the other shear line having only a partial thickness $C_1$ located below the bottom surface of the lowermost sheet $S_2$. By making the fastener in this way, the high unit loading at the point M by loads applied in the direction of the arrow N is lessened since the bearing area between the different thicknesses of material is increased simply by sloping the pierced segment or composite web W.

With further reference to the drawings, and in particular FIGS. 5 through 9, one form of novel apparatus that can be used for fabricating the fasteners 1a of the instant invention generally comprises a cooperating punch and die 20 and 22. The die 22 is provided with a shank or body section 24, the lower portion of which is threaded so that it can be conveniently affixed to a conventional tool holder. Projecting upwardly from the body portion 24 is at least one and preferably a plurality of anvils 26a and 26b which can advantageously be made integral with the body portion 24. These anvil elements 26a and 26b can be advantageously curved at their free extremities such that each of their free extremities has a generally arcuate work-engaging surface 28, which in a preferred form of the invention is also tapered in a direction normal to the arc of a surface 28. When the anvil elements 26a and 26b are curved in this fashion, the web W of fastener 1a will be slightly curved from fold line 2' to fold line 4' in the manner shown in dotted lines in FIG. 4. A spindle 32 is disposed in suitable apertures 32a in the anvils 26a and 26b. Mounted on spindle 32 and in interdigitated relationship with the anvil elements 26a and 26b is one or more working cutter elements 34, 34a and 34b. These cutter elements are preferably shaped somewhat like washer elements. The die assembly is completed by means of additional non-working cutter elements 34c and 34d mounted upon the extremities of spindle 32, a pair of helical springs 38 interposed between cutter elements 34b and 34d, 34a and 34c, and screw and washer means 40 affixed to the opposing ends of the spindle 32. Cutter elements 34c and 34d can thus serve as washer-like anchoring elements, as well as reserve cutter elements when not in use.

The helical spring elements 38 advantageously bias the outermost working cutter elements 34a and 34b against the sides of anvils 26a and 26b. The innermost cutter element 34 is of such a width that it fits snugly in the space 37 between the upwardly projecting anvils 26a and 26b. It is contemplated in the case of the outermost spring-biased working cutter elements 34a and 34b that these cutters would be displaced slightly from their abutting relationship with respect to the anvil members 26a and 26b at the end of the fastener-forming operation whereby the portion of the fastener adjacent at least one of the incisions 5' or 6', as indicated in FIGS. 10 and 11, can be displaced beneath the bottom surface of the lowermost sheet $S_2$ of the overlapping sheets and be projected or spread thereunder into contact with the bottom surface 7' as the punch 20 reaches the bottom of its stroke, as indicated in FIG. 9, in forming a fastener 1a, as shown in FIGS. 10 and 11. For this reason, the central openings 42 in the cutters 34a, 34b, 34c and 34d are purposely made sufficiently larger than the periphery of spindle 32 whereby the cutters can be slightly rocked on and loosely held on the spindle 32 during the bottoming of punch 20.

The punch 20 of the apparatus, as indicated in FIGS. 5 through 9, is comprised of at least one and preferably a pair of cutter elements 50 and 52 located in alignment with anvils 26a and 26b of the die 22. These cutter elements are removably fastened by a pin 20' to an arbor 54 which can be suitably secured to a moving part of the press (not shown), such that the punch 20 can be given the requisite upward and downward movement relative to the die 22. Cutters 50 and 52 are each provided with a preferably arcuate work-engaging surface 56, which is also preferably tapered in a plane P or in a direction normal to the arc of the surface 56 in such a fashion that the work-engaging surfaces 56 of the cutters 50 and 52 will properly mate with the arcuate and tapered work-engaging surfaces 28 on the anvils 26a and 26b. The opposing side edges 60 and 61 of the cutter elements 50 and 52 are also advantageously tapered or sloped. This tapering of the side edges 60 and 61 of each cutter element 50 and 52 occurs in planes P' which are generally normal to the main plane P of taper of the curved or arcuate working surfaces 56 of the cutters 50 and 52. These side edges 60 and 61 act to form the converging side folds 2' and 4' of the plurality of fasteners 1a that can be simultaneously made by the apparatus shown in FIGS. 5–9 of the drawings. It is to be observed that the working cutter elements 34, 34a and 34b are of such a cross-sectional dimension that they are out of bearing contact with the main shank or body portion 24 of the die 20 whereby all stresses and loads imposed upon the die 20 are transferred primarily into the anvils 26a and 26b and then through these anvils into the shank portion 24 of the die 22. This tends to stabilize the die portion of the apparatus in a very efficient fashion during operation. If desired, the tips 100 of the cutters 50 and 52 can be somewhat leveled off.

In the operation of an apparatus, such as that shown in FIGS. 5–9, overlying pieces of material, such as metal pieces $S_1$ and $S_2$, are placed between the punch 20 and the die 22. The punch is then moved downwardly or relative to die 22 in such a fashion that the work-engaging surfaces 56 of the punch 20 pierce both of the overlapping pieces $S_1$ and $S_2$ of material. As the pieces $S_1$ and $S_2$ of material are pierced, integral portions are struck out from each of the pieces of material $S_1$ and $S_2$ and a displacement of the composite fastener web W formed from integral parts of the pieces of material $S_1$ and $S_2$ takes place along the incision lines 5' and 6' and the fold lines 2' and 4'. In this connection, it will be observed, reference being made particularly to FIG. 6, that the cutters 50 and 52 of the punch 20 are preferably tapered in a plurality of planes. First of all, there is a tapering of the surfaces 56 of the punch 20 in the plane P which is normal to the work-engaging surfaces 56, such that the main body or web W of the fastener will have a slope or taper of the type shown in FIGS. 10 and 11. Secondly, the edges 60 and 61 of the cutters 50 and 52 are also tapered in the planes P' which are normal to the main plane P in order to locate the fold line 2' and 4' of the fastener 1a in a converging fashion relative to each other. As the punch 20 moves downwardly, therefore, as indicated in FIGS. 8 and 9, it effects a predetermined displacement of the integral portions of the overlapping sheets forming composite web W out of the respective planes of the pieces of material from which the said integral portions are formed. This displacement action of the punch 20 continues until the fastener is fully displaced in the manner desired.

In general, it can be said that during the preferred forming of a fastener 1a of the instant invention, the portions or pieces of material constituting the composite main body or web W of a fastener are first severed from the overlapping sheets $S_1$ and $S_2$ along incision lines 5' and 6' which are preferably parallel and spaced equidistant apart along their length. Thereafter, the composite web W is displaced along both the incision lines 5' and 6' and along the spaced converging fold lines 2' and 4'. Each of the spaced converging lines 2' and 4' also fully intersects with the incision lines 5' and 6'. The composite web W is displaced from the normal planes of the sheets $S_1$ and $S_2$ from which composite web W is made under the action of the punch 20 until at least a part of the displaced web W adjacent one of the incisions 5' or 6' is first completely located below the bottom surface 7' of the lowermost piece of material $S_2$ being joined and thereafter spread against the said bottom surface 7'.

FIG. 12 discloses a modified form of punch and die apparatus that can be used in practicing the instant invention. In the punch and die apparatus of FIG. 12, means are provided whereby the die can be simply adjusted so as to accommodate itself and the overall apparatus to varying gauges or thicknesses in the overlapping sheets of material $S_1$ and $S_2$ being worked upon by the punch 21' and die 22' to form a fastener of the instant invention. In this instance, therefore, the punch 21' can have the same general structure as that shown in FIGS. 5–9. The die 22', however, in addition to having a body portion 24' is provided with a bore 25' within which is disposed the stem 26' of the head 27' of the die 22'. The head 27' is provided with upstanding anvil members 26a and 26b. A pin 32' is used to anchor the plurality of cutters 70, 71, 72 and 73 to the anvil members 26a and 26b in interdigitated relationship. Cutters 70, 71, 72 and 73 are biased against the anvils 26a and 26b by means of conventional disc springs 75. It is to be understood that when the die 22' of FIG. 12 is used the anvils 26a and 26b of die 22' will be aligned with the cutters 50 and 52 of the punch 21'.

For the purposes of adjusting the die 22' relative to a punch 21' in accordance with the gauges of the pieces $S_1$ and $S_2$ of material being worked on, an advantageous embodiment of the invention contemplates that the head portion 27' will be moved relative to body portion 24' and held in a removably adjusted position by one or more shim elements 80. Shim elements 80 can be made of spring steel and have a U-shaped configuration whereby they can be easily snapped about stem member 26' and at the same time interposed between the shoulder 81 of die body portion 24' and the arms 82 of the head portion 27'. Shims 80 in effect act as stops and abutments after the height of die 22' has been adjusted with respect to its associated punch 21'. For the purpose of holding the shims 80 in place, an advantageous embodiment of the invention contemplates that threaded pin members 82 and 83 may be used. Pin members 82 are threadedly affixed to head portion 27' of the die 22' while pin members 83 are threadedly affixed to the body portion 24' of the die 22'. When a tension spring 85 is wrapped about a pair of opposing pin members 82 and 83, the head member 27' will be resiliently biased against one or more shim or stop members 80 and thus lock or anchor the shim members in place. A slight upward movement of head portion 27' by means of a suitable tool will allow the removal or addition of whatever shim members 80 are required for a particular fastener-forming operation.

Advantageous embodiments of the invention have been herein disclosed and described. It is obvious that the various changes and modifications may be made therein without departing from the spirit and scope thereof, as defined in the appended claims, wherein

What is claimed is:

1. In an apparatus for joining overlapping pieces of material together the combination of a die and a punch, said die including an anvil and at least one cutter element biased against said anvil, said anvil being provided with a work-engaging surface, said punch also having a cutter element cooperatively associated with the cutter element of the die and aligned with the said anvil on said die, the cutter element on the punch being provided with a work-engaging surface which matches the configuration of the work-engaging surface on the anvil and the side edges of the cutter element on the punch being angularly disposed in planes normal to the work-engaging surface of said last-mentioned cutter element whereby as the punch and die are closed about overlapping pieces of material a portion of each piece of material will be displaced out of the respective normal planes thereof to effect a joint therebetween.

2. An apparatus as set forth in claim 1 wherein the work-engaging surfaces of the anvil on the die and of the cutter element on the punch have cooperating arcuate configurated portions.

3. An apparatus as set forth in claim 1 wherein the work-engaging surface of the cutter element on said punch and the work-engaging surface of the anvil on said die are tapered in planes normal to said work-engaging surfaces.

4. An apparatus as set forth in claim 1 including means for adjusting the operating position of the anvil of said die with respect to the cutter element of the punch.

5. In an apparatus for joining overlapping pieces of material together the combination of a die and a punch, said die including an anvil and a pair of cutter elements, at least one of which is biased against said anvil, and said punch also having a cutter element cooperatively associated with a cutter element of the die while being aligned with the said anvil of said die, the cutter element of the punch being provided with a work-engaging surface which matches the configuration of the work-engaging surface on the anvil, the side edges of the cutter element on the punch being angularly disposed in planes normal to the work-engaging surface of said last-mentioned cutter element and the work-engaging surface of the cutter element on said punch and the work-engaging surface of the anvil on said die also being tapered in planes normal to the said work-engaging surfaces of the said anvil and said last-mentioned cutter element whereby as the punch and die are closed about overlapping pieces of material a portion of each piece of material will be displaced out of the respective normal planes thereof to effect a joint therebetween.

6. An apparatus as set forth in claim 5, wherein the work-engaging surfaces of the anvil and the cutter element on said punch have cooperating arcuate configurated portions.

7. In an apparatus for joining overlapping pieces of material together the combination of a die and a punch, said die including a plurality of anvils and cutter elements interdigitated with said anvils, at least one of said anvils being provided with a generally arcuate work-engaging surface, said punch also having a plurality of cutter elements cooperatively associated and aligned with the anvils on said die, the work-engaging surfaces of the cutter elements on said punch having configurations which match the configurations of the work-engaging surfaces on the anvils, and the side edges of the cutter elements on the punch being angularly disposed in planes normal to the work-engaging surfaces of said last-mentioned cutter elements, whereby as the punch and die are closed about the overlapping pieces of material a portion of each piece of material will be displaced out of the respective normal plane thereof to effect a joint therebetween.

8. An apparatus as set forth in claim 6 wherein the work-engaging surfaces of the cutter elements on the punch and the work-engaging surfaces of the anvils are tapered in planes normal to the work-engaging surfaces of the anvil and the cutter elements on the punch.

9. An apparatus as set forth in claim 6 including means for removably affixing the cutter elements of the die to the anvils on the die and means for resiliently biasing certain of the cutter elements of the die against the said anvils.

10. An apparatus as set forth in claim 6 including means for adjusting the operating positions of the anvils of said die with respect to the cutter elements of said punch.

References Cited by the Applicant

UNITED STATES PATENTS 2,619,855 12/1952 Williams.
2,924,312 2/1960 Williams.

RICHARD H. EANES, JR., *Primary Examiner.*